United States Patent [19]

Tanaka

[11] Patent Number: 5,018,927
[45] Date of Patent: May 28, 1991

[54] METHOD FOR ASSEMBLING AND STORING GOODS, APPARATUS THEREOF, AND METHOD FOR CONTROLLING THE APPARATUS

[75] Inventor: Nobuhiro Tanaka, Saitama, Japan

[73] Assignees: Kao Corporation, Tokyo; Seibu Electric & Machinery Co., Ltd., Fukuoka, both of Japan

[21] Appl. No.: 434,500

[22] Filed: Nov. 13, 1989

Related U.S. Application Data

[63] Continuation of Ser. No. 167,312, Mar. 11, 1988, abandoned.

[30] Foreign Application Priority Data

| Mar. 11, 1987 | [JP] | Japan | 62-55531 |
| Mar. 23, 1987 | [JP] | Japan | 62-42422[U] |
| Jun. 30, 1987 | [JP] | Japan | 62-162983 |
| Aug. 5, 1987 | [JP] | Japan | 62-196015 |

[51] Int. Cl.$^5$ ............................................. B65G 1/00
[52] U.S. Cl. ................................. 414/331; 414/273; 414/278
[58] Field of Search ............... 414/273, 276, 331, 313, 414/787, 277, 278, 279, 280, 281, 282, 283

[56] References Cited

U.S. PATENT DOCUMENTS

| 3,780,858 | 12/1973 | Weiss et al. ............. 414/331 X |
| 4,561,820 | 12/1985 | Matheny, III et al. .......... 414/331 |

FOREIGN PATENT DOCUMENTS

| 236191 | 9/1987 | European Pat. Off. ............. 414/331 |
| 58-139902 | 8/1983 | Japan . | |
| 36001 | 2/1984 | Japan ........................ 414/331 |
| 59-212301 | 12/1984 | Japan . | |
| 212304 | 12/1984 | Japan ........................ 414/331 |
| 93007 | 5/1985 | Japan ........................ 414/331 |
| 23009 | 1/1986 | Japan ........................ 414/277 |
| 61-55005 | 3/1986 | Japan . | |
| 248801 | 11/1986 | Japan ........................ 414/273 |
| 61-263505 | 11/1986 | Japan . | |

Primary Examiner—Robert P. Olszewski
Assistant Examiner—James R. Bidwell
Attorney, Agent, or Firm—Birch, Stewart, Kolasch & Birch

[57] ABSTRACT

A method for assembling and storing goods has a carousel equipped with a plurality of goods storing portions for storing goods which are to be assembled and stored, and a device for supplying goods, which are to be transferred to the goods storing portions from which goods have been taken out, to adjacent the goods storing portions. The method being characterized in that when a supplement of goods becomes necessary due to the goods having been taken out of the goods storing portions so as to be subjected to an assembling and storing operation, goods which are already supplied to the above-mentioned somewhere near the goods storing portions by the device for supplying, are transferred to the goods storing portions which are required to be supplemented with goods.

2 Claims, 8 Drawing Sheets

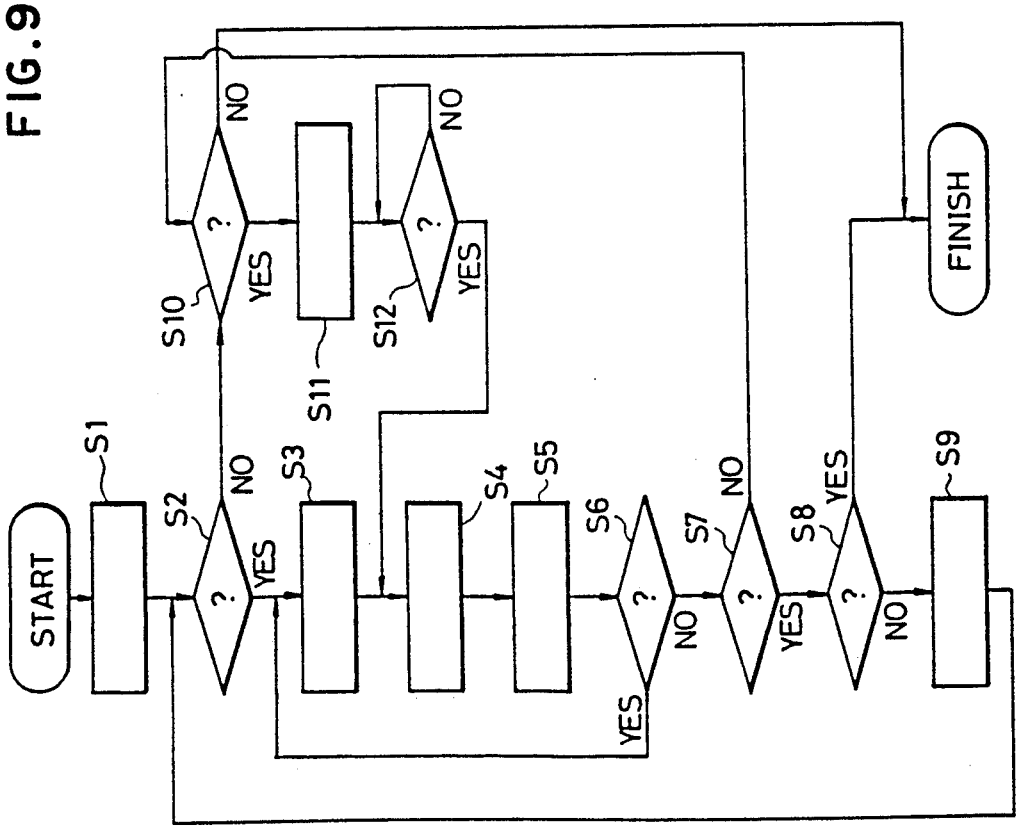

FIG. 9

S1: PICKING START FOR CERTAIN DESTINATION
S2: IS THERE PICKING COMMAND FOR PARTICULAR STAGE OF STORING CAROUSEL SINGLE STAGE 11a
S3: TURNING OF PATICULAR STAGE OF STORING CAROUSEL SINGLE STAGE 11a
S4: PICKING INDICATION OF GOODS TAKE-OUT INDICATING DEVICE 5
S5: PICKING
S6: IS THERE PICKING COMMAND FOR OTHER GOODS STORING PORTIONS 12a ON OTHER SECTIONS OF STORING CAROUSEL SINGLE STAGE 11a
S7: IS THERE PICKING COMPLETE OF OTHER STAGE OF STORING CAROUSEL SINGLE STAGE 11a
S8: IS THERE PICKING COMPLETE FOR ALL DESTINATIONS
S9: PICKING START FOR NEXT DESTINATION
S10: IS THERE NEXT PICKING COMMAND FOR PARTICULAR STAGE OF STORING CAROUSEL SINGLE STAGE 11a
S11: TURNING TO PARTICULAR SECTION FOR NEXT PICKING
S12: IS THERE PICKING COMPLETE ON OTHER STAGE OF CERTAIN DESTINATION ON OTHER STAGE OF STORING CAROUSEL SINGLE STAGE 11a

FIG.11

STORE CODE 1 2 3 4 5 6

CLIENT NAME MESSRS. AAAAAAA

STORE NO.=002

METHOD FOR ASSEMBLING AND STORING GOODS, APPARATUS THEREOF, AND METHOD FOR CONTROLLING THE APPARATUS

This application is a continuation of application Ser. No. 07/167,312 filed on Mar. 11, 1988, now abandoned.

BACKGROUND OF THE INVENTION

1. Field of the Invention

This invention relates to a method for assembling and storing various goods according to their destinations, or for assembling and storing goods according to destinations, items and sizes thereof, also to an apparatus thereof and further to a method for controlling the apparatus. More particularly, the invention relates to a method for assembling and storing goods utilizing a carousel, also to an apparatus thereof and further to a method for controlling the apparatus.

2. Description of the Prior Art

In the prior art of assembling and storing goods, there have been known those disclosed, for example, in Japanese Patent Application Early Laid-open Publication No. Sho 58-139902, Japanese Patent Application Early Laid-open Publication No. Sho 61-55005, Japanese Patent Application Early Laid-open Publication No. Sho 61-263505, etc.

The prior art disclosed in the above-mentioned Japanese Early Laid-open Publications will be described briefly.

Japanese Patent Application Early Laid-open Publication No. Sho 58-139902 discloses a carousel comprising a carry-in and carry-out working section disposed to a linear movement passageway of the carousel and comprising an area including the entire length of goods storing section rows in a direction perpendicular to the turning direction of the carousel and also including a plurality of goods storing section rows in the turning direction, and carry-in and carry-out working object indicating means disposed at a position corresponding to each goods storing section located within the carry-in and carry-out working section.

Similarly, Japanese Patent Application Early Laid-open Publication No. Sho 61-55005 discloses an itemizing equipment which comprises a plurality of goods storing device comprising a stationary shelf disposed at an accumulation conveyor side, and an indicating device for indicating the number of goods which are to be taken into a storing device on a conveyor from each goods storing device or into each goods storing device from the storing container.

Likewise, Japanese Patent Application Early Laid-open Publication No. Sho 61-263505 discloses an automatic goods storing system which comprises a horizontal circulating carousel provided with a plurality of goods storing ports, and a terminal device disposed at each goods storing port, so that an adjustment is performed according to each carry-in and carry-out request from each terminal device.

Furthermore, in the prior art relating to a carousel equipped with carry-in and carry-out means, there have been known those which are disclosed, for example, in Japanese Patent Application Early Laid-open Publication No. Sho 59-212304, etc. This Publication discloses a carousel which comprises a movable roller conveyor which is vertically reciprocally movable along a supporting post, a side pusher for pushing out goods placed on the movable roller conveyor onto a corresponding tray located at a generally same level, and a conveyor for carrying the goods onto the movable conveyor located at a predetermined height.

However, each of the afore-mentioned prior art has the following problems.

That is, in Japanese Patent Application Early Laid-open Publication No. Sho 58-139902, because of a provision of plurality of goods storing section rows, the each unit rotating amount is arranged so that goods can be easily carried in and out without frequently turning the carousel by a worker. However, when goods are to be carried in (supply), a certain item of goods and a certain quantity of goods are carried in, according to a list, to goods storing sections corresponding to a working object indicating lamp provided to each goods storing section. Therefore, a worker must perform carry-in work with respect to the goods which have been carried there by a truck, etc. into a goods storing portion while confirming that the goods storing portion is the correct storing place. However, even if a worker pays his utmost attention in carry-in work, sometimes there occur human errors in which goods are located in a wrong goods storing portion. Further, since the carry-in work and the carry-out work cannot be performed simultaneously, in other words, since the carry-in work (supplement of goods) cannot be performed during the carry-out work (assembling and storing work of goods), all goods must be carried in before the assembling and storing work is started when a large quantity of goods are to be assembled and stored. As a result, the carousel must be made large.

In Japanese Patent Application Early Laid-open Publication No. Sho 61-55005, goods are assembled and stored in accordance with an indicating device which indicates the number of goods which are to be taken into a storing container from a goods storing apparatus. However, there is no description at all about the goods that are supplied to a goods storing apparatus nor about the goods that are supplied during the assembling and storing work relative to the goods. Although such an arrangement is made as the goods are assembled and stored in accordance with an indicating device which indicates the number of goods which are to be taken into the goods storing apparatus from the storing container, in this case, the goods which are to be assembled and stored, are already stored in the goods storing apparatus. And, there is no description at all about storing means for storing goods which are to be assembled and stored.

In Japanese Patent Application Early Laid-open Publication No. Sho 61-263505 and Japanese Patent Application Early Laid-open Publication No. Sho 59-212304, there is no description nor suggestion at all about the goods stored on a carousel which are to be assembled and stored.

In a carousel described in Japanese Patent Application Early Laid-open Publication No. Sho 61-263505, no matter whether the preceding carry-in or carry-out request has been effected, the next carry-in or carry-out request can be input and the carry-in and/or carry-out work can be performed one after another in accordance with the carry-in or carry-out request already input. However, since only one goods storing body can be stopped at a goods carry-in and carry-out port on each storing stage, the carry-in work or carry-out work cannot be performed until the next goods storing body is positioned at the goods carry-in and carry-out port.

The present invention has been accomplished in order to solve the above-mentioned problems inherent in the prior art.

SUMMARY OF THE INVENTION

It is therefore a first object of the present invention to provide a method for assembling and storing goods, in which goods supplied by supplying means can be suitably added to a carousel while goods stored on the carousel are being taken out so as to be provided to an assembling and storing operation, thereby to efficiently and rapidly assemble and store goods without making the goods storing capacity of the carousel large.

A second object of the present invention is to provide a goods assembling and storing apparatus which is suitably used for carrying out the afore-mentioned goods assembling and storing method.

A third object of the present invention is to provide a controlling method which is employed in the aforementioned goods assembling and storing apparatus.

In order to achieve the first object, there is essentially provided a method for assembling and storing goods including a carousel having a plurality of goods storing portions for storing goods which are to be assembled and stored, and means for supplying goods, which are to be transferred to the goods storing portions from which goods have been taken out, to somewhere near or adjacent the goods storing portions, the method being characterized in that when a supplementation of goods becomes necessary because goods have been taken out of the goods storing portions so as to be subjected to the assembling and storing work, the goods, which are already supplied to somewhere near the goods storing portions by the supplying means, are transferred to the goods storing portions which are required to be supplemented with goods.

In order to achieve the second object, there is essentially provided a goods assembling and storing apparatus for assembling and storing a plurality of goods comprising a carousel having a plurality of goods storing portions for storing goods which are to be assembled and stored; supplying means having a goods carrying portion for supplying goods, which are to be transferred to the goods storing portions from which goods have been taken out, to somewhere near or adjacent the goods storing portions; supplement request indicating means disposed to a position corresponding to some portions or all of the goods storing portions; and transfer indicating means disposed to a position corresponding to some portions or all of the goods carrying portions.

In order to achieve the third object of the present invention, there is essentially provided a method for controlling a goods assembling and storing apparatus comprising a plurality of individual storing carousel stages, each able to turn along a horizontal circulating passageway and the stages being disposed at suitable spaces in a vertical direction. The storing carousel stages are each provided with a plurality of goods storing portions with respect to a turning direction respectively. Each of the storing carousel stages being provided with a carry-in and carry-out working portion able to carry in or carry out goods with respect to the goods storing portions, a corresponding number of goods storing portions corresponding to the carry-in and carry-out working portions being turned or stopped as a unit, when goods are carried in or carried out with respect to the goods storing portions, the method being characterized in that after a plurality of sets of carry-in data or carry-out data are input by serving a carry-in data or carry-out data with respect to the plurality of storing carousel single stages as a set, goods are carried in or carried out for each set of carry-in data or carry-out data, the storing carousel stages, in which a carry-in work or carry-out work has been completed according to the one set of carry-in data or carry-out data, before the carry-in work or carry-out work is completed with respect to all storing carousel single stages according to the one set of carry-in data or carry-out data, the goods storing portion in which goods are to be carried in or from which goods are to be carried out according to next one set of carry-in data or carry-out data, is turned to the carry-in working portion or carry-out working portion.

That is, according to the goods assembling and storing method and the apparatus for carrying out the method of the present invention, since goods supplied by the supplying means can be suitably supplied to the carousel while goods stored on the carousel are being taken out so as to be subjected to the assembling and storing work, goods can be efficiently and rapidly assembled and stored without making the goods storing capacity of the carousel large.

Further, according to the goods assembling and storing apparatus described in the preferred embodiment of the present invention, when a plurality of items of goods are to be carried in or carried out for each destination, or when such goods are to be assembled and stored, or carried in or carried out for each destination, each item and/or each size, the number of the goods storing portion unit including goods which are to be carried in or carried out can be indicated on a monitor indicating device for each carry-in or carry-out working unit (desired carry-in or carry-out work). Therefore, if this apparatus is employed, goods can be efficiently and rapidly carried in or carried out.

Furthermore, according to the method for controlling the goods assembling and storing apparatus of the present invention, while the goods carry-in or carry-out work is being performed with respect to a predetermined goods storing portion of one carousel stage among a plurality of carousel stages, a carousel stage to which the carry-in or carry-out work has been performed is turned so as to bring a goods storing portion, with which the next carry-in or carry-out work is to be performed, to the carry-in working portion or a carry-out working portion. Therefore, goods can be efficiently and rapidly carried in or carried out.

The above-mentioned first, second and third objects and other objects of the present invention will become more apparent from the following detailed description with reference to the accompanying drawings, in which;

BRIEF DESCRIPTION OF THE DRAWINGS

FIGS. 1, 2 and 3 schematically illustrate one embodiment of the present invention, wherein FIG. 1 is a plan view, FIG. 2 is a front view and FIG. 3 is a side view;

FIGS. 5 and 6 schematically illustrate respective goods take-out working portions, wherein FIG. 5 is an enlarged front view and FIG. 6 is an enlarged side sectional view;

FIG. 9 is a flow chart showing the carry-out steps of goods according to one embodiment of a method for controlling a goods assembling and storing apparatus of the present invention;

FIG. 11 is a front view showing one example of a Store No. label employed in a goods number examining method.

DETAILED DESCRIPTION OF THE PREFERRED EMBODIMENT

One preferred embodiment of a goods assembling and storing apparatus according to the present invention will be described first with reference to the accompanying drawings.

Figure 1:
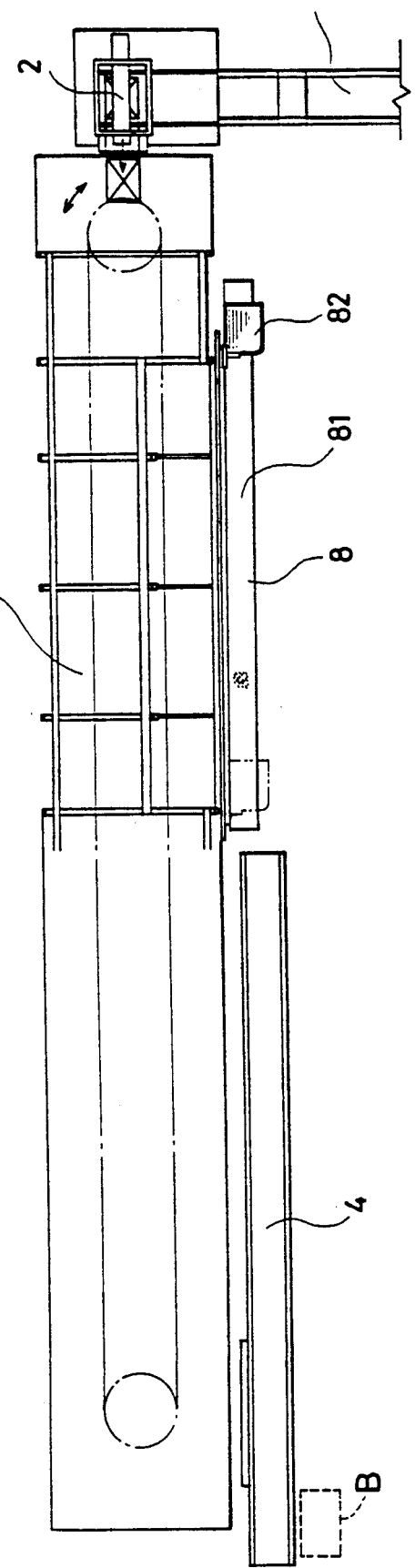
Figure 2:
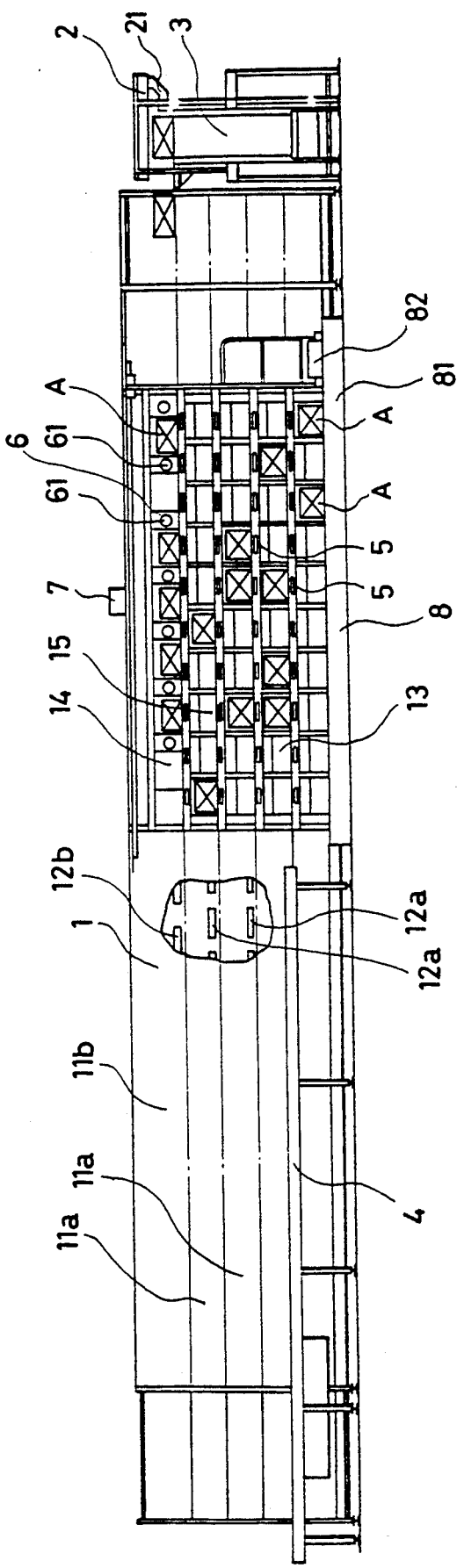
Figure 3:
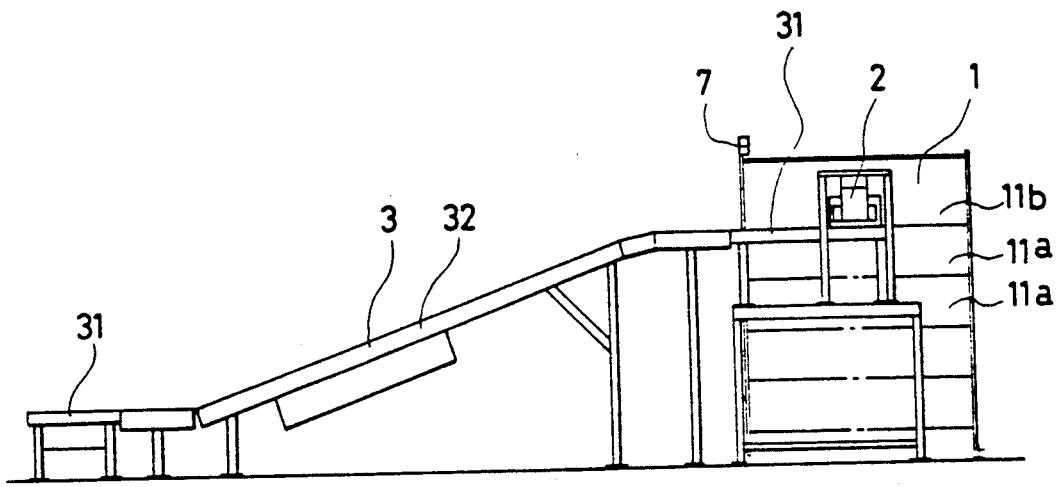

FIGS. 1 through 3 illustrate one embodiment of a goods assembling and storing apparatus of the present invention, wherein FIG. 1 is a plan view, FIG. 2 is a front view, and FIG. 3 is a side view. In these figures, 1 denotes a carousel (horizontal carousel) which comprises a multistage (5 stages) of carousel single stages able to turn along a horizontal circulating passageway and disposed at suitable spaces in a vertical direction. In this embodiment, the carousel stage at the uppermost stage serves as a supplying carousel single stage 11b which constitutes supplying means of the present invention, whereas the remaining stages (the remaining 4 stages from the bottom) of the carousel are provided as storing carousel stages 11a which constitute a carousel of the present invention. Each of the storing carousel stages 11a is provided with a plurality (60 pieces in this embodiment) of goods storing portions (trays) 12a for storing goods A which are to be assembled and stored. On the other hand, the supplying carousel single stage 11b constituting the supplying means of the present invention is provided with a plurality (45 pieces in this embodiment) of goods carrying portions (trays) 12b for supplying goods A which are to be transferred to a goods storing portion or portions 12a; from where goods A have been taken out and thus empty, to somewhere near the goods storing portion or portions 12a from where goods A have been taken out and thus requiring a supplement of goods A. These goods storing portions 12a and goods carrying portions 12b are movably supported on an elongated elliptical rail road at each carousel stage, and are secured at equal spaces to a driving chain looped and tensioned around the rail road between a drive sprocket wheel and a driven sprocket wheel as such that when the drive sprocket wheel is actuated by each motor, a carousel stage can be turned independently from the remaining stages.

Figure 5:
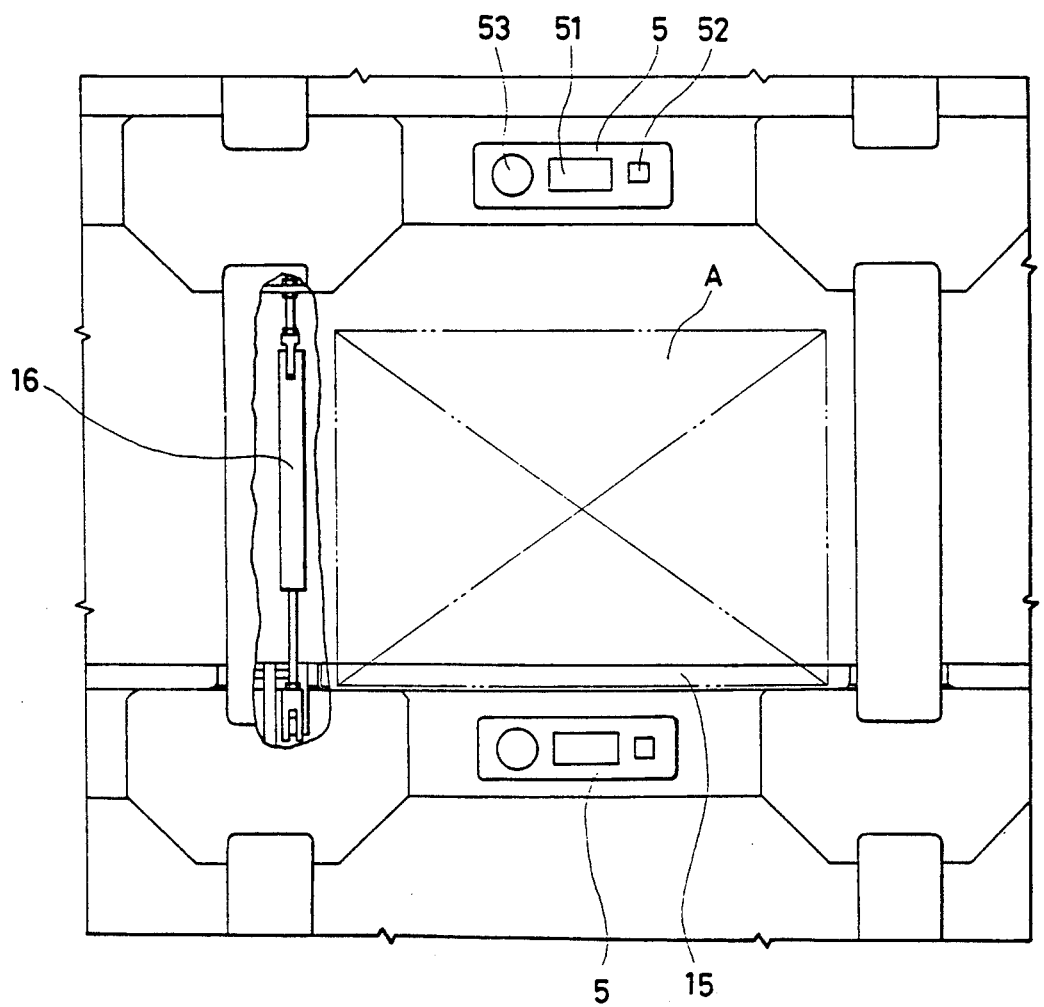
Figure 6:
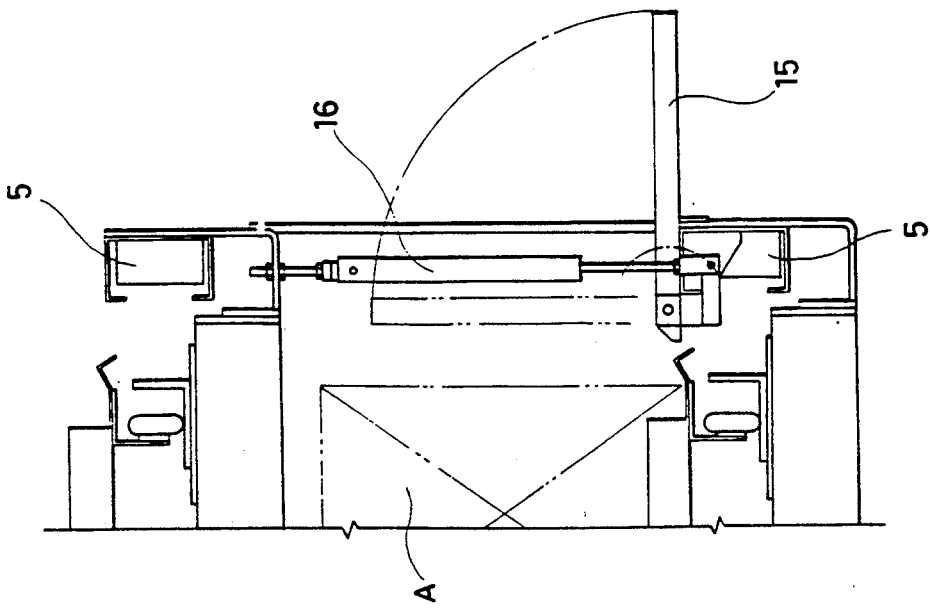

Reference numeral 13 denotes a goods take-out working portion which is disposed opposite a linear movement passageway portion of the storing carousel stages 11a at the carousel 1. In this embodiment, the goods take-out working portion 13 has 40 sections or frontage openings corresponding to the total 40 goods storing portions 12a comprising 10 goods storing portions 12a with respect to each storing carousel single stage 11a. Each section or frontage opening, as shown in FIG. 5 and 6, is provided with a goods take-out indicating device 5 as a supplement request indicating means of the present invention, and a section gate or frontage gate 15 which also serves as a take-out apron and opened and is closed by an air cylinder 16. The goods take-out indicating device 5 is provided with a number indicating lamp 51 for digitally indicating the number of goods which are to be taken out (assembled and stored) by a worker, a complete button 52 for clearing the indication, and a take-out indicating lamp 53 for providing a picking command to a worker. A suitable lamp for indicating an empty section or frontage which requires a supplement of goods A may be separately provided according to necessity. In this embodiment, an empty section or empty frontage which requires a supplement of goods A is known by a "0" indication of the number indicating lamp 51. In order to prevent a possible occurrence of mistakes in taking wrong goods out or supplying wrong goods in the section or frontage, each section gate or frontage if goods A are involved; gate 15 is opened only when goods A must be taken out of the goods storing portion 12a of each section, or when goods A must be supplied into the goods storing portion 12a of each section. Instead of a provision of the section gate 15, there may be provided, for example, a wind-up type open-and-close gate or the like in front of each section in order to prevent a possible occurrence of mistakes in taking wrong goods out or supplying wrong goods in the section. The provision of the section gate 15 is not indispensable and this can be omitted. Likewise, instead of a provision of the complete button 52, the indication of the number indicating lamp 51 may be cleared by a worker's closing of the section gate 15.

Figure 4:
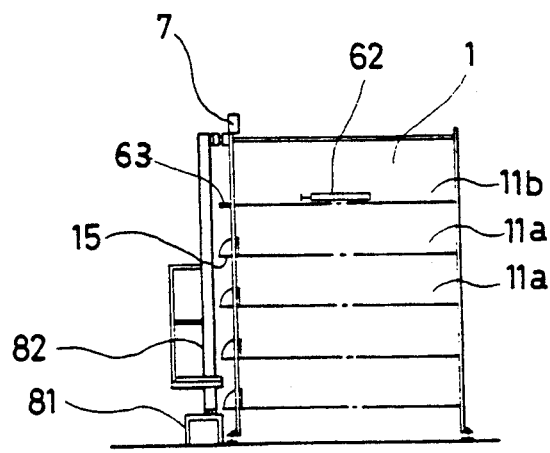
FIG. 4 is a sectional side view schematically showing a goods transfer working portion thereof.
Figure 8:
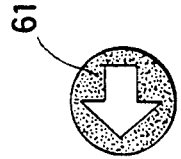
FIG. 8 is an enlarged front view of a transfer indicating device thereof.

Reference numeral 14 denotes a goods transfer working portion disposed at an upper portion of the goods take-out working portion 13 in such a manner as to be in alignment with the linear movement passageway portion of the supplying carousel single stage 11b at the carousel 1. The goods transfer working portion 14 is provided with 7 frontages on openings corresponding to the corresponding number (7 pieces) of the goods carrying portions 12b. Each frontage is provided, as transfer indicating means of the present invention, a transfer indicating device 6 comprising an illuminating type push button 61 having an arrow mark as shown in FIG. 8, and a transfer pusher 62 as shown in FIG. 4. Each frontage is further provided with a stationary apron 63. Each frontage at the goods transfer working portion 14 functions as a transfer position from which goods A are to be supplied to the goods storing portion 12a which is empty since goods A have been taken out. The goods transfer working portion 14 may be provided only with the transfer pusher 62, that is, the transfer indicating device 6 is not indispensable. Similarly, the goods transfer working portion 14 may be provided only with the transfer indicating device 6, that is, the transfer pusher 62 is not indispensable.

Reference numeral 2 denotes a pressing device disposed at a reverse passageway of the turning passageway of the supplying carousel stage 11b. The pressing device 2 is provided with a pressing pusher 21 which comprises a presser plate able to move reciprocally, and an air cylinder for reciprocally moving the presser plate. Due to the foregoing arrangement, goods A are supplied to the supplying carousel single stage 11b by the pressing pusher 21. The pressing device 2 may be disposed opposite the linear movement passageway portion of the supplying carousel single stage 11b.

Reference numeral 3 denotes a carry-in conveyor for carrying goods A which are carried into the supplying carousel stage 11b. The carry-in conveyor 3 comprises a roller conveyor 31 and an inclination belt conveyor 32. The carry-in conveyor 3 is provided at its goods carry-in portion with a gun scanner (bar code reader, not shown) for reading a bar code label of the goods A which are carried in. The carry-in conveyor 3 is further provided at its goods carry-in portion with a goods carry-in station (not shown), a carry-in request lamp (not shown), a carry-in complete push button (not shown), etc.

Reference numeral 4 denotes a carry-out conveyor for carrying out goods A which have been assembled and stored. The carry-out conveyor 4 comprises a belt conveyor.

Figure 7:
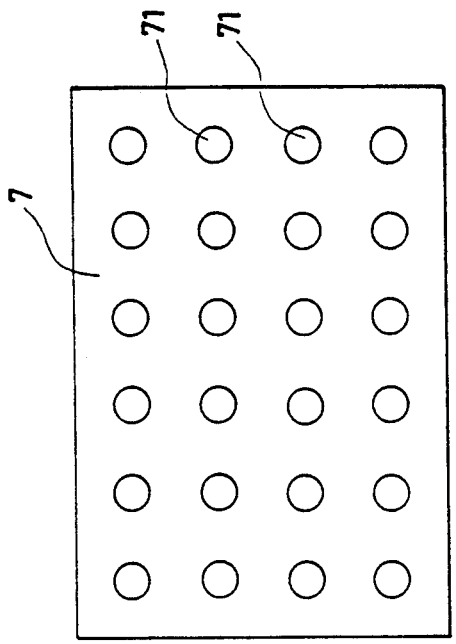
FIG. 7 is an enlarged front view schematically showing a monitor indicating device thereof.

Reference numeral 7 denotes a monitor indicating device. The monitor indicating device 7, as shown in FIG. 7, includes 24 indicating lamps 71 in total, i.e., 6 lamps in the lateral direction and 4 lamps in the vertical direction. The monitor indicating device 7 represents by bits 6 horizontal indicating lamps 71 the number of sections comprising 10 goods storing portions 12a in each of a storing carousel stage. Each row represents one of the four storing carousels stages. That is, a worker learns from the indicating lamps 71 the number of sections comprising 10 pieces of goods storing portions 12a at each stage and, therefore, is able to assemble and store goods contained in the number of sections comprising 10 pieces of goods storing portions 12a for one destination, for example. When the assembling and storing work for such one set of sections has been completed, one lamp of the indicating lamps 71 is extinguished. When all of the indicating lamps 71 are extinguished, it means that the goods taking-out work (assembling and storing work) has been completed. The vertically aligned indicating lamps 71 of the monitor indicating device 7 are corresponded to the storing carousel single stage 11a at a particular stage in which goods are to be carried in or carried out.

Reference numeral 8 denotes a working footstep which comprises a stationary footstool 81 and a movable footstool 82 which is moved to a transfer place when goods are transferred.

The above-mentioned parts or portions constituting a goods assembling and storing apparatus of the present invention are actuated by a picking (assembling and storing) command, a supplying command, a carry-in command, etc. of a control unit (not shown) including a stock control CPU, etc. At the same time, the above-mentioned parts or portions are able to output necessary information to such control unit.

Next, one embodiment of a method for assembling and storing goods of the present invention will be described in detail, in which the afore-mentioned goods assembling and storing apparatus is employed. The mode of controlling by the control unit will also be described.

Before describing one embodiment of a method for assembling and storing goods of the present invention, several preconditions will be described. The 60 goods storing portions 12a at each storing carousel stage 11a, with each storing carousel stage being turned independently from the remaining storing carousel stages 11a, are divided into 6 sections, each section including 10 goods storing portions 12a. Each frontage contains one set of goods A selected from powdery foundation, mascara, lipstick, etc. The items of goods A are different in each section. And, each goods storing portion 12a has a stationary location and the items of goods A which are to be contained therein are predetermined. Further, each storing carousel stage 11a is designed so that it is turned and stopped repeatedly in a unit of 10 pieces of goods storing portion 12a so that one set of goods (10 pieces in total) are always brought to be opposite the 10 frontage openings of the goods take-out working portion 13. When this operation is performed 6 times, all goods A are brought to the goods take-out working portion 13.

The assembling and storing (take-out or picking) of goods is performed so that different kinds of goods A are assembled and stored for each destination or each store where the goods are to be distributed, with the data being already registered in the control device beforehand. And, according to a carry-in command of the control device based on this data, the 45 goods carrying portions 12b of the supplying carousel single stage 11b contain predetermined kinds of goods A. The carry-in of goods into the goods carrier portions 12b will be described in detail afterward.

Each storing carousel stage 11a has 6 sections of goods storing portions 12a containing the goods A mentioned above. Further, the data are registered as so that the carry-in (supplementation) or carry-out (assembling and storing )work can be performed per one set of carry-in data or carry-out data by inputting a plurality of carry-in data or carry-out data by serving the carry-in data or carry-out data as one set with respect to the storing carousel single stage 11a. Although the items of the goods A which are stored in the storing carousel single stage 11a at each stage are not limited, when, for example, goods A are taken out of each stage to make a total 4 sets of same assortments of the goods A, it is preferable that the turning of the storing carousel single stage 11a at each stage is controlled so as to obtain a picking chance from the multistage of storing carousel single stages 11a.

Prior to the picking of goods, in one embodiment of a method for assembling and storing goods of the present invention, each storing carousel stage 11a is turned or remains stationary according to the picking command from the control device so that the goods storing portions 12a containing a predetermined item of goods A, which are to be picked up, are positioned opposite each frontage on opening in the goods take-out working portion 13. When the storing carousel stage 11a is stopped, the take-out indicating lamps 53 of the goods take-out indicating devices 5 of a predetermined frontage, which is to be picked up, in the goods take-out working portion 13 are lighted up. The number indicating lamps 51 digitally indicates the number of goods A which are to be picked up. Further, the air cylinder 16 is actuated to cause the frontage gate 15 of a predetermined frontage to open. At the same time, the indicating lamps 71 of the monitor indicating device 7 are lighted up, as previously mentioned, according likewise to the picking command from the control unit so as to indicate the exact number of sections (goods storing portion unit) from which the goods A are to be picked up per each stage. In this case, the way of indication may be such that a worker can recognize the particular frontage indicated including its position. Otherwise, three indicating lamps 71, for example, may be lighted up simply from the left.

Accordingly, in order to accomplish a carry-out (assembling and storing, taking-out, and picking-up) operation, a worker may simply be engaged at a frontage for which the take-out indicating lamps 53 are lighted and the frontage gates 15 are opened. Thus, if the assembling and storing work is performed in this way, the assembling and storing work for each destination can be correctly performed without mistakes because the picking command is in accordance with the data for each destination which are registered in the control device. When a worker pushes the complete button 52 every time a picking work is completed with respect to each frontage, the air cylinder 16 is actuated to close the frontage gate 15 of the utilized frontage and to clear the indication of the number indicating lamp 51, and further to extinguish the take-out indicating lamp 53. Needless to say, a worker may close the frontage gate 15 by himself. The picked-up goods A are placed on the carry-out conveyor 4 by the worker.

In one embodiment of a method for assembling and storing goods of the present invention, everytime a goods storing portion 12a becomes empty as a result of the afore-mentioned assembling and storing work, a worker supplies goods A to the empty goods storing portion 12a so as to make it ready for a next assembling and storing operation. In order to supply goods A, a worker transfers new goods A in goods carrying portions 12b in openings or frontages in the goods transfer working portion 14 to the goods storing portion 12a of a predetermined frontage on opening in the good take-out working portion 13 which requires a supplement of goods A. When such supplement of goods A becomes necessary (i.e., when the goods storing portion 12a becomes empty due to the picking work), the frontage gate 15 of a predetermined frontage in the goods storing take-out working portion 13 is not closed even if the complete button 52 is pushed. When the complete button 52 is pushed, the number indicating lamp 51 in that particular frontage indicates "0" (in the case an arrangement is made as such that the frontage gate 15 is closed not by the complete button 52 but by a worker, when the frontage gate 15 is closed, the frontage gate is opened again and the number indicating lamp 51 indicates "0" in that particular frontage), the number indicating lamp 51 exhibits a supplement request function which is an additional function to its own take-out request indication function. At the same time, the supplying carousel stage 11b starts turning, and the predetermined goods carrying portion 12b is stopped at a predetermined frontage (transfer position) in the goods transfer working portion 14. Thereafter, the transfer pusher 62 is actuated in that particular frontage on opening, and goods A which are to be supplemented (transferred) are pushed out onto the stationary apron 63 in that particular frontage. At the same time, the illuminated push button 61 which includes the transfer indicating device 6 is lighted up in that particular frontage. Accordingly, in order to carry out the supplying on supplementing work, a worker simply transfers goods A, which has been pushed out onto the stationary apron 63 in a predetermined frontage indicated by the illuminated push button 61, to the goods storing portion 12a of a predetermined frontage in the goods take-out working portion 13 for which the frontage gate 15 is opened and the number indicating lamp 51 reads "0". If the goods A are supplemented in this way, since the goods transferring operation is carried out in accordance with the supplement command from the control device, possible mistakes in such supplementing work can be almost completely prevented.

When a method for assembling and storing goods according to the present invention is carried out, it is preferable that the goods assembling and storing apparatus shown in FIGS. 1 through 3 is controlled by a method for controlling a goods assembling and storing apparatus according to the present invention. In that case, since the carry-out of goods (assembling/storing, take-out or picking) is performed in accordance with the steps shown in FIG. 9, the method for controlling a goods assembling and storing apparatus according to the present invention will be described with reference to FIG. 9.

FIG. 9 is a flow chart (one stage of the carousel storing stages) showing the steps of carry-out of goods. The above-mentioned carry-out of goods is performed in accordance with steps S1 through S12. That is, the picking of goods for a certain destination is started in the step S1. In step S2, it is distinguished whether or not there is a picking command for a particular storing carousel stage 11a. If "yes" is determined, according to steps S3 through S5, the particular stage of the storing carousel stage 11a is turned and the goods take-out indicating device 5 indicates a picking operation. Then, a carry-out of the goods (picking work in the illustrated example) is performed by a worker. After the picking work is completed, it is distinguished in step S6 whether or not there is a picking command for a goods storing portions 12a on other sections of the storing carousel stage 11a. If "yes" is determined, then it goes back again to the step S3 for turning the particular stage of the storing carousel stage 11a. The above-mentioned procedure is repeated until "no" is determined in the step S6.

If "no" is determined in the step S6, then it goes to the step S7 in which it is distinguished whether or not the picking is completed for other storing stages 11a of the storing carousel. If "yes" is determined, it goes to the step S8 in which it is distinguished again whether or not the picking for all destinations is completed.

If "yes" is determined in step S8, it means that the picking work for all destinations has been completed. Therefore, the carry-out work of goods is finished here. However, if "no" is determined in the step S8, it goes to the step S9 and then back again to the step S2 in order to perform the picking work for the remaining destinations and the same procedure is repeated thereafter.

In the above-mentioned procedure, if no picking command is received in step S2 and if picking work for another stage is not completed in step S7, it goes to step S10. In step S10, it is distinguished whether or not there is next a picking command for a particular storing stage of the carousel. If "no" is determined, the carry-out work is finished here. If a picking command is present, a turning operation positions a particular section of storing carousel single stage for a next picking operation in step S11. Then, it goes to step S12. In step S12, it is distinguished whether or not the picking work for a destination on another stage of the storing carousel stages 11a is completed, and the picking operation is halted until "yes" is determined there. If "yes" is determined, it goes to step S4 and the procedure after the step S4 is performed.

When the carousel in the assembling and storing apparatus shown in FIGS. 1 through 3 is controlled by the afore-mentioned controlling method, it is preferable that the stop position of the goods carrying portion 12b positioned due to the turning of the goods carrying stage 11b is in an upper portion of a frontage in the goods take-out working portion 13 which requires a supplement of goods. As a modified controlling method, the frontage gate 15 for a predetermined frontage in the goods take-out working portion 13 may be closed by pressing the complete button 52 and then opened again. Then, prior to the "0" indication of the number indicating lamp 51 in the frontage, the supplying carousel single stage 11b may be turned so that the goods carrying portion 12b is stopped at a predetermined frontage (transfer position).

When goods have been added on supplemented (carry-in), a worker pushes the illumination type push button 61 in order to cause the control device to output an information of supplement complete and closes the frontage gate 15 by pushing the complete button 52. By this, the "0" indication on the number indicating lamp 51 as the supplement request indication is cleared. In case a further picking work is required from the same frontage, the take-out indicating lamp 53 of the goods take-out indicating device 5 is lighted up, the number indicating lamp 51 digitally indicates the number of goods A which are required to be picked up, and the air cylinder 16 is actuated to open the frontage gate 15 of a predetermined frontage in the reverse way of the above-mentioned procedure. Accordingly, a worker may simply be engaged in the assembling and storing work of the goods A in the same manner as the aforementioned case.

When the assembling and storing work of goods A (contained in 10 goods storing portions 12a) of a predetermined one set (one section of storing carousel stage) is completed with respect to a particular storing carousel stage 11a that indicating lamp 71 for the particular stage of the monitor indicating device 7 is extinguished. As soon as the assembling and storing work of the goods A and when the supplementing work of the goods A are completed, that particular storing carousel stage 11a is started to turn according to the picking command of the control device, and the goods storing portion 12a containing the items of goods A which are to be picked up next is stopped in a position opposite a predetermined frontage in the goods take-out working portion 13. Therefore, a worker may simple be engaged in the assembling and storing work on the goods A with respect to this frontage as previously mentioned. When a supplement of the goods A is required, the turning of the storing carousel single stage 11a is in principle started only after the goods A are supplemented to the predetermined frontage in the goods take-out working portion 13 as previously described. However, when the predetermined items of goods A are not present in the supplying carousel stage 11b, the supplementing work is skipped and the assembling and storing work on other goods A is performed first, and the carry-in of the predetermined items of goods A onto the supplying carousel stage 11b is postponed.

By repeating the above-mentioned procedure, the indicating lamps 71 of the monitor indicating device 7 are extinguished one after another. When all indicating lamps 71 are extinguished, the assembling and storing work of goods A is completed for a certain destination (one store to which the goods A are to be delivered).

In this way, when the carry-out work from the storing carousel stage 11a on a particular stage has been completed with respect to a certain destination, the storing carousel stage 11a on that particular stage, as shown in FIG. 9, is turned until a section of storing carousel stage containing the goods A which are to be carried out for the next destination is brought to the carry-in and carry-out working portion 13 and then waits until the carry-out work from the storing carousel single stage 11a on all stages has been completed with respect to the certain destination. When the carry-out work of the goods A has been completed with respect to the certain destination, a picking command, etc. are output from the control unit again for the next destination, and the take-out indicating lamp 53 of the goods take-out indicating device 5 are lighted up. Therefore, by effecting the assembling and storing work of the goods A, and by effecting the supplement of the goods A based on this, the assembling and storing work on a predetermined items of and a predetermined number of goods A can be performed separately for each destination.

If a store No. label or a store No. card is issued for each destination in accordance with the data for each destination which are registered in the control device, the goods A which have been assembled and stored in accordance with the data for each destination as mentioned can be stored in a picking work box together with the store No. label or the store No. card and placed on the carry-out conveyor 4.

The carry-in of goods A into the supplying carousel stage 11b according to one embodiment of a method for assembling and storing goods of the present invention is carried out as follows.

That is, first, a plurality of carry-in commands are output for a plurality of, for example, destinations (a plurality of stores), from the control device based on the assembling/storing data for each destination registered in the control device and the supplement complete information, etc. output to the control device as previously described. Based on this, the carry-in request lamp of a carry-in station in the goods carry-in portion of the carry-in conveyor 3 is lighted up. Therefore, a worker in the carry-in station may put a predetermined goods A on the conveyor 3 at random according to this indication in such a manner as to allow a gun scanner to read a bar code label of the goods A and push the carry-in complete push button of the carry-in station.

Upon pressing of the carry-in push button, the goods A placed on the roller conveyor 31 of the carry-in conveyor 3 are carried in front of the pressing pusher 21 of the pressing device 2 via the inclination belt conveyor 32. And, since such carried in goods A have already had the bar code label thereof read by the gun scanner and items thereof are already determined, the confirmed information is input into the control device.

On the other hand, the control device already receives information on the empty goods carrying portions 12b in the supplying carousel stage 11b beforehand. Based on the information, the control device outputs a turning command to the supplying carousel stage 11b so that the empty goods carrying portion 12b which requires a new carry-in is brought to a carry-in position in front of the pressing pusher 21 of the pressing device 2.

When the control device confirms the fact that the empty goods carrying portion 12b which requires a new carry-in is stopped in the afore-mentioned carry-in position, a carry-in command is output from the control device. According to this carry-in command, the pressing pusher 21 is actuated and the goods A in front thereof are carried into the empty goods carrying portion 12b stopping in the afore-mentioned carrying position. In this embodiment, the goods carrying portion 12b is in a free location.

Positioning the goods A into a goods carrying portion 12b is performed, if required, even during the assembling and storing of the goods.

The goods assembling and storing apparatus and the goods assembling and storing method according to the present invention are of course not limited to the above-mentioned embodiments. For example, the storing carousel stages and the supplying carousel stage may be provided with the same number of goods storing portions or goods carrying portions (trays) at equal spaces. Further, the supplying means may be a simple conveyor. For example, a roller conveyor may be disposed in the vicinity of the goods take-out working portion of the storing carousel comprising a horizontal carousel, and the roller conveyor may be provided at its side portion with a transfer indicating device.

Similarly, the method for controlling a goods assembling and storing apparatus according to the present invention is of course not limited to the afore-mentioned embodiment, either. For example, in the carry-in and carry-out portion, instead of performing the carry-in and carry-out work together, only the carry-in work or only the carry-out work may be performed. As one mode for performing only the carry-in work, a carousel which is not equipped with the supplying carousel stage may be employed as the goods assembling and storing apparatus. And, in the carousel, various goods which are to be assembled and stored are allotted with an assembling and storing place. When the goods which are to be assembled and stored are carried in a goods storing portion corresponding to the particular assembling and storing place, assembling and storing (carry-in) data on the plurality of goods are input and thereafter, the assembling and storing (carry-in) work is performed for each goods. When the carousel single stage has finished the assembling and storing (carry-in) work for the goods and before the assembling and storing (carry-in) work is completed for all carousel single stages, the goods storing portion in which next goods are to be assembled and stored (carry-in) according to next set of carry-in data may be turned to the carry-in working portion. Further, the supplying means may be a simple conveyor. For example, a roller conveyor may be disposed in the vicinity of the carry-out working portion of the horizontal carousel, and the roller conveyor may be provided at its side portion with a transfer indicating device. Although the empty goods storing portions are supplied on supplemented with new goods everytime such portions become empty, they may be supplemented with new goods when the goods stored therein become less than a standard storing quantity.

Furthermore, by providing a number examining device to the goods assembling and storing apparatus, the number of a plurality of items of goods which have been assembled and stored for each destination by the assembling and storing apparatus as previously described can be examined.

One embodiment of the number examining device for examining the number of goods which are to be picked up in batch unit and a number examining method will be described hereinafter.

A number examining device of this embodiment comprises a computer as control means, and an adder for adding the number of goods which are picked up. The term "picking" when used herein means assembling and storing, or taking out of goods, storing of goods, supplementing of goods, or the like all for that purpose.

An adder B which is employed in the number examining device of this embodiment will be described first.

Figure 10:
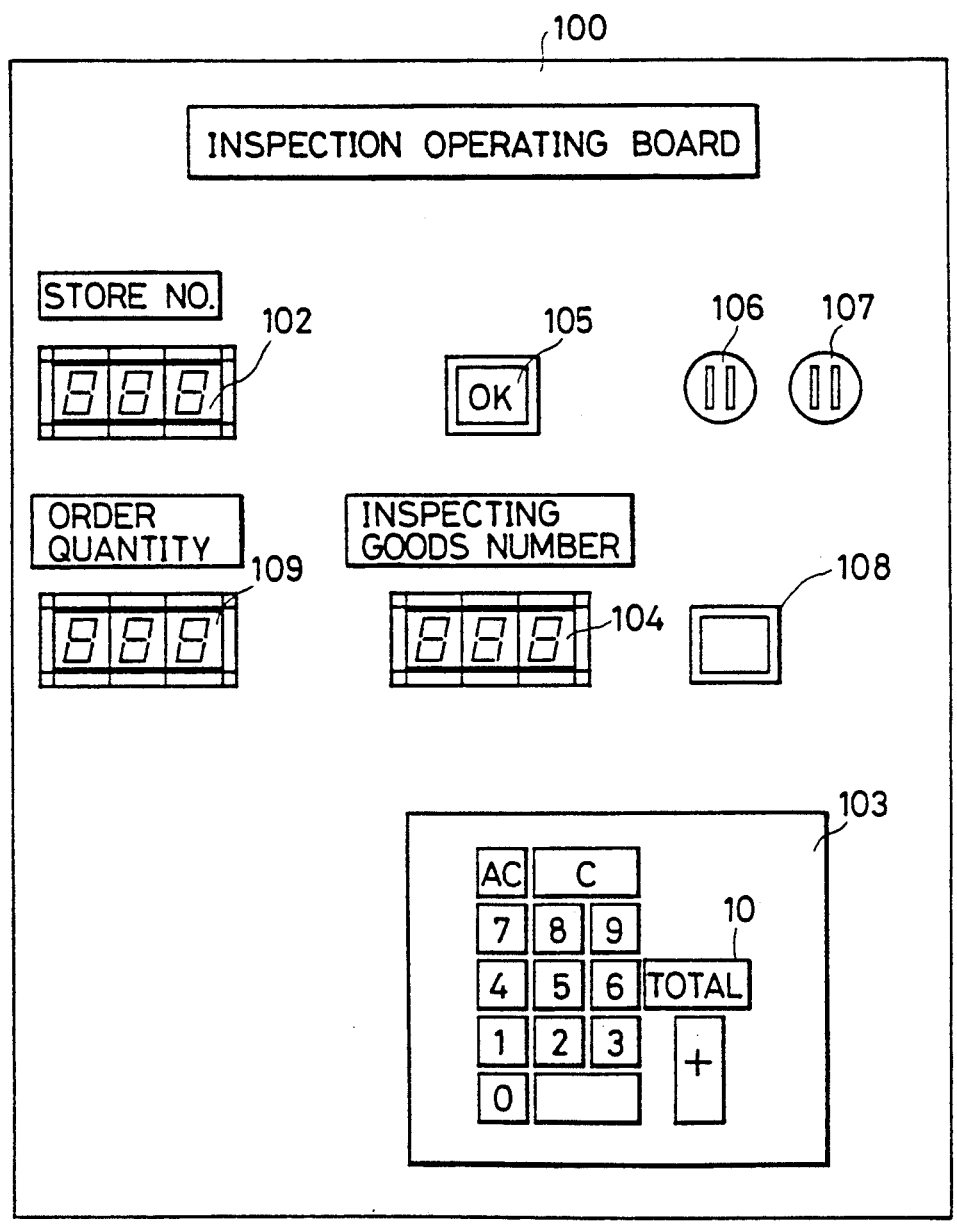
FIG. 10 is a plan view showing one example of a goods inspection operating board in which an adder is built.

In this embodiment, the adder B, as shown in FIG. 1 (not shown in FIG. 2), is disposed to a number examining place located near the end portion of the downstream side of the carry-out conveyor 4 in the carousel 1. And, the adder B is built in a goods inspection operating board 100 shown in FIG. 10. The goods inspection operating board 100 is connected to the afore-mentioned computer and has various functions. That is, the goods inspection operating board 100 includes a store No. indicating device 102 for indicating a destination store, as an object to be examined in number, to which goods are to be delivered, a keyboard 103 for inputting the number of goods A which have been picked up for the afore-mentioned destination store, an inspecting goods indicating device 104 for indicating the number of goods A which have been input by the keyboard 103, a next store receiving button 108 for inputting the start of a number examining work, an order quantity indicating device 109 indicating an order quantity from the destination store, an OK lamp 105 which is lighted up when the total of the number of goods input by the keyboard 103 is in agreement with the order quantity and a buzzer 106 which is buzzed at that time, and another buzzer which is buzzed when not in agreement (the buzzing sounds of the first and the second buzzers are different). In the number examining device of this embodiment, an input or output from the goods inspection operating board 100 to the afore-mentioned computer can be effected. Further, the computer controls the goods inspection operating board 100 so that the various functions thereof are properly worked.

The number examining device of this embodiment comprises the carousel 1, the computer, and the adder B as previously described. Therefore, the goods A can be correctly picked up from the carousel 1. Moreover, the number of goods A which have been picked up can be correctly added.

A number examining method using the afore-mentioned number examining device will be described next. The term "number examining" when used herein means a series of actions starting from a picking process for picking goods according to an order from a destination store of the goods and ending at a confirming process for confirming whether or not the goods picked up are in conformity with the order. In some cases, it also means the simple calculation of the number of goods.

One embodiment of a number examining method of a plurality of goods which are picked up in batch unit will be described next.

When an order quantity batch unit) from one store is large, the batch unit is divided into a plurality of smaller working units so as to more suitably carry out the number examination work. By dividing the batch unit into a plurality of smaller working units, even when the batch unit comprises a plurality of items of goods as previously described, the number examination can be rapidly and correctly carried out. Thus, the number examination mistakes can be prevented to occur.

Regarding the division of the batch unit, for example, when an order quantity from one store is so large in batch unit as to exceed 100 pieces, the batch unit is divided into more than 2 or 3 working units. At that time, the same items of goods are preferably not divided and collected in a group. Therefore, the number of goods included in the working unit may of course be suitably changed within a workable range.

The way of dividing the batch unit will be described more in detail. When an order quantity from one store (for example, store No. 002) is 174 pieces in batch unit, this unit is divided into 3 working units as shown in Table 1 listed hereunder.

TABLE 1

| Working Unit | Goods No. | Imaginary Store No. |
| --- | --- | --- |
| (1) | 87 Pieces | 901 |
| (2) | 60 Pieces | 902 |
| (3) | 27 Pieces | 002 |

In Table 1, the three working units (1), (2) and (3) after division are 87 pieces, 60 pieces and 27 pieces in number of goods respectively. Further, the working units (1), (2) and (3) respectively are given Store No. 901, Store No. 902 as imaginary store Nos. and Store No. 002 (Actual Store No. for a final working unit), and a store No. label or store No. card attached with the afore-mentioned numbers are issued as illustrated in FIG. 11.

Figure 12:
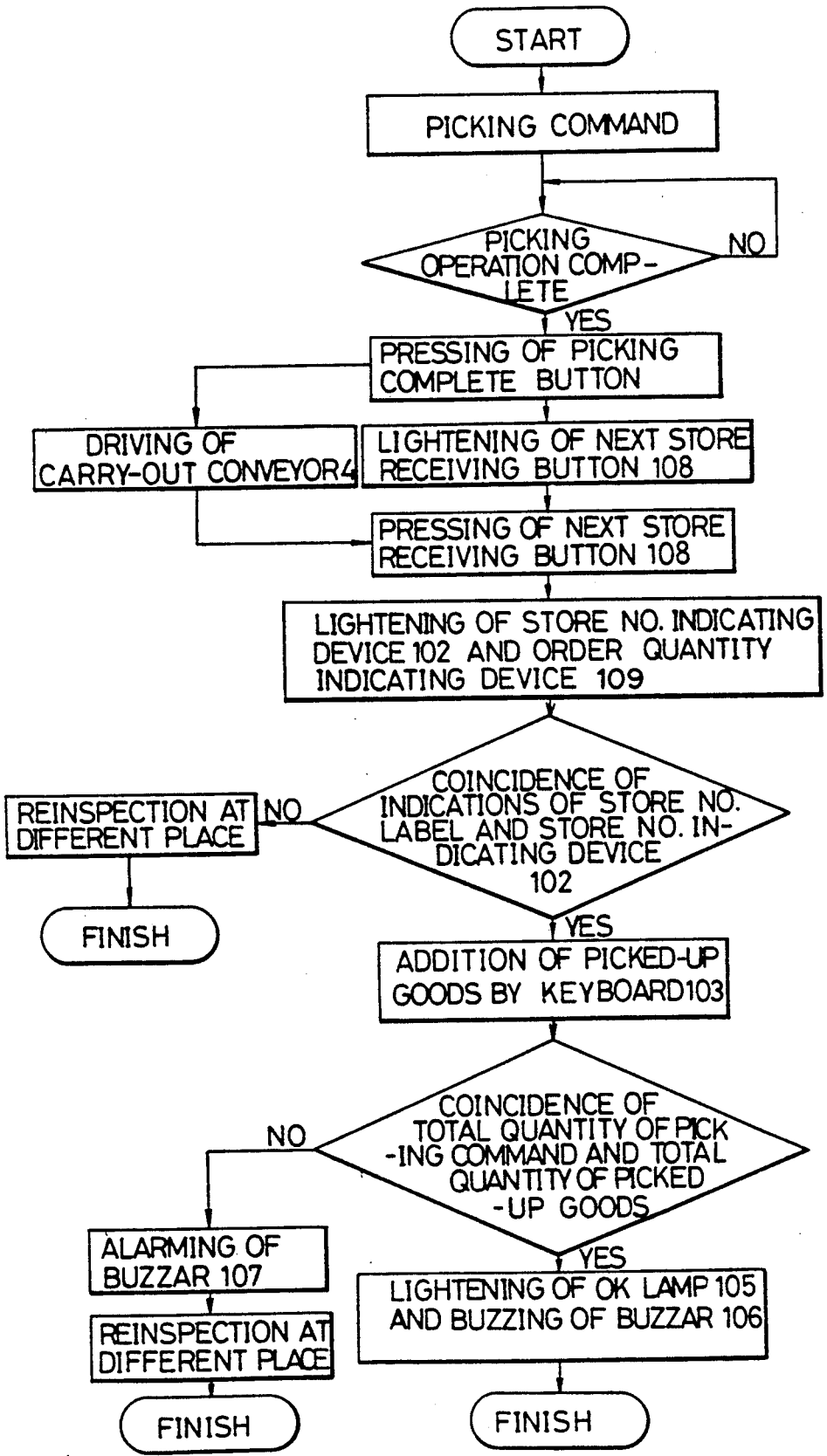
FIG. 12 is a flow chart showing one example of a goods number examining method.

The imaginary store No. which is given to each working unit as described above after the goods A in batch unit are divided into a plurality of working units comprising a suitable number of goods as previously described, is input into the computer together with other necessary information, and thereafter, the number examining work is continued for each working unit according to the flow chart shown in FIG. 12.

That is, a picking command is issued based on the information already input in the computer for one working unit. Based on this command, the take-out indicating lamp 53 of the goods take-out indicating device 5 of a predetermined frontage in the carousel 1 is lighted up and at the same time, the content of a predetermined picking work is indicated. Thereafter, the picking work for picking the goods A from the frontage according to the content of the picking work is performed in accordance with the afore-mentioned picking method. Such picked up various items of predetermined goods A are stored in a picking work box (not shown) together with the store No. label or store No. card issued beforehand. By this, the picking work is completed.

At the time point when the picking work is completed, the picking complete button (not shown) disposed in the vicinity of the end portion of the upperstream side of the carry-out conveyor 4 is pushed. Then, the picking work box for which the picking work has been completed is placed on the carry-out conveyor 4 which is actuated by pushing operation to the picking complete button and carried to the number examining place located in the vicinity of the end portion of the downstream side of the carry-out conveyor 4.

Further, when the picking complete button is pushed by a worker, the next store receiving button 108 of the goods inspection operating board 100 located in the afore-mentioned number examining place is lighted up.

If the next store receiving button 108 is pushed by a worker when the preparation for the number examining work has been completed, the store No. indicating device 102 of the goods inspection operating board 100 and the order quantity indicating device 109 perform the indicating work according to the information input in the computer beforehand.

A worker confirms whether or not the number printed on the store No. label or the store No. card which are carried together with the goods A is in accord with the number indicated on the store No. indicating device 102. When "no" is confirmed, they are transferred to another place for reinspection. When "yes" is confirmed, the following adding work is performed.

The adding work is performed on the goods A contained in the afore-mentioned picking work box by using the keyboard 103 of the adder B provided to the goods inspection operating board 100. More specifically, the adding work is performed by inputting suitable quantity such as, for example, 5 pieces, 2 pieces, 6 pieces, 4 pieces and so on while the goods A are transferred into other number examining box (not shown). Such input quantity is indicated on the inspecting goods indicating device 104.

At the time point when all quantity of the goods A included in the working unit have been input, the total key 103-1 of the keyboard 103 is pushed. As a result, the total quantity for the working unit is figured out. Then, it is determined whether or not the total quantity which has been figured out by the keyboard 103 is in accord with the total quantity based on the picking command which is indicated on the order quantity indicating device 109. When "no" is confirmed, the buzzer 107 is buzzed and the OK lamp 105 is not lighted up. Therefore, the presence of non-conformity in quantity can be easily recognized. In that case, such goods are transferred to another place where they are reinspected by reviewing the order list. On the other hand, when "yes" is confirmed, the OK lamp 105 is lighted up and at the same time, the buzzer 106 having a different buzzing sound from that of the buzzer 107 is buzzed. Since a worker can confirm the fact that the number examining operation has been completed through both his visual sense and his auditory sense, the number examining work of the working unit portion (imaginary store portion) for the afore-mentioned one store is finished. When the number examining operation has been finished, the working unit of goods A are transferred to a packing process where a preparation for delivery is performed. Since the conformity or non-conformity of the total quantity of an order based on the picking command with respect to the total quantity input by the keyboard 103 can be automatically found out as mentioned above, the order quantity indicating device 109 may be usually covered with a protecting cover and may be uncovered only when the non-conformity has been confirmed.

After the number examining operation is finished for the afore-mentioned working unit, the same number examining work is performed on other working units in accordance with the number examining method. In this way, by repeating the number examining operation on each working unit which constitutes a batch unit, even if the batch unit includes various items of a plurality of goods A, the number detecting work can be performed simply by inputting the quantity of the goods A included in the working unit by the keyboard 103. Therefore, the number examining operation on the batch unit of goods A can be rapidly and correctly performed.

Further, in one embodiment of the number examining method, since the picking work of the goods A is performed at the frontage of the goods take-out working portion 13 provided with the frontage gate 15 which is opened and closed by the computer using the aforementioned carousel 1, the picking work can be correctly performed with no mistakes with respect not only to the quantity of the goods but also to the items.

Therefore, in the number examining method, simply by confirming the fact that the total quantity of the goods A is in accord with the order quantity, in other words, without performing a number examining work for each and every item, a generally same effect can be obtained compared with a case in which the number examining work is performed for all items of goods. Thus, the number examining work can be very correctly performed.

When the goods inspection is performed by using the number examining device of the above-mentioned embodiment, the unit of the goods is of course not required to be divided into a plurality of working units. Instead, the goods inspection may be performed in batch unit.

According to the number examining device and the number examining method, the quantity inspection of goods, etc. can be rapidly and correctly performed with making the number examining unit of goods small or by confirming the total quantity of the number examining unit of goods picked up. Therefore, even if the batch unit picked up includes various items of a plurality of goods, the number examining work of goods can be correctly performed. Thus, the goods can be correctly packed and delivered with no mistakes with respect to destinations, order quantity, order items, etc.

While specific embodiments of the present invention have been shown and described in detail to illustrate the application of the principles of the present invention, the descriptive and illustrative materials employed herein are utilized for purposes of exemplifying the present invention and not in limitation thereof. Accordingly, numerous modifications of the present invention will occur to those skilled in the art without departing from the spirit and scope of the present invention. Moreover, it is to be understood that certain features of the present invention can be used to advantage without a corresponding use of other features thereof.

What is claimed is:

1. A goods assembling and storing apparatus for assembling and storing a plurality of goods comprising
   a carousel having a plurality of goods storing portions for storing goods which are to be assembled and stored;
   a plurality of frontages each having an opening therein;
   said plurality of goods storing portions being selectively positionable behind said openings;
   each of said frontage openings being provided with a frontage gate;
   means for opening said frontage gate only when goods must be taken out of the goods storing portion located in the opening or when goods must be supplied into the goods storing portion in the opening;
   supplying means having a goods carrying portion for supplying goods, which are to be transferred to said goods storing portions from which goods have been taken out, to a position adjacent said goods storing portions;
   plural goods of the same kind are stored in each of the portions for storing goods and in each goods carrying portion;
   said supplying means including a supplying stage of said carousel, said stage being movable along a horizontal circulating passageway;
   supplement request indicating means disposed at a position corresponding to some portions or all of said goods storing portions; said supplement request indicating means has a take-out request indicating function to indicate the number of goods which are to be taken out; and
   transfer indicating means disposed at a position corresponding to a part or all of said goods carrying portion.

2. A goods assembling and storing apparatus as claimed in claim 1, wherein said carousel includes a plurality of storing carousel stages able to turn along a horizontal circulating passageway and disposed at suitable spaces in a vertical direction, said storing carousel stages including a plurality of goods storing portions with respect to a turning direction thereof respectively, each said storing carousel stage is provided with a carry-in and carry-out working portion able to carry in or carry out goods with respect to said plurality of goods storing portions, a corresponding number of said goods storing portions corresponding to said carry-in and carry-out working portion are turned or stopped as one unit and said frontages being located in said carry-in and carry-out working portion.

* * * * *